(12) United States Patent
Nafis et al.

(10) Patent No.: US 6,519,359 B1
(45) Date of Patent: Feb. 11, 2003

(54) RANGE CAMERA CONTROLLER FOR ACQUIRING 3D MODELS

(75) Inventors: Christopher Allen Nafis, Vischer Ferry, NY (US); Nelson Raymond Corby, Jr., Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/428,567

(22) Filed: Oct. 28, 1999

(51) Int. Cl.[7] .................................................. G06K 9/00
(52) U.S. Cl. ....................... 382/154; 382/106; 382/285; 348/46; 348/50
(58) Field of Search ........................ 356/2–32; 348/46, 348/50, 211.9; 382/154, 106

(56) References Cited

U.S. PATENT DOCUMENTS

| | | | | |
|---|---|---|---|---|
| 4,831,621 A | * | 5/1989 | Coutures | 327/407 |
| 4,942,618 A | * | 7/1990 | Sumi et al. | 102/444 |
| 4,991,224 A | * | 2/1991 | Takahashi et al. | 382/154 |
| 5,193,124 A | * | 3/1993 | Subbarao | 348/349 |
| 5,471,541 A | * | 11/1995 | Burtnyk et al. | 356/604 |
| 5,682,229 A | * | 10/1997 | Wangler | 348/31 |
| 5,930,383 A | * | 7/1999 | Netzer | 382/106 |
| 6,005,607 A | * | 12/1999 | Uomori et al. | 345/32 |
| 6,118,946 A | * | 9/2000 | Ray et al. | 356/3 |
| 6,268,918 B1 | * | 7/2001 | Tanabe et al. | 356/226 |
| 6,434,255 B1 | * | 8/2002 | Harakawa | 379/100.15 |
| 6,441,864 B1 | * | 8/2002 | Minami et al. | 348/584 |

* cited by examiner

*Primary Examiner*—Joseph Mancuso
*Assistant Examiner*—Brian Q Le
(74) *Attorney, Agent, or Firm*—Jean K. Testa; Patrick K. Patnode

(57) ABSTRACT

A method of acquiring a three-dimensional surface image of an object using a range camera automatically calculates an optimal number of scans. The optimal number of scans is calculated in accordance with operator-defined and camera optical parameters. Scan data acquired for each scan is merged with a preference for higher resolution data over lower resolution data for any given scanned area, such that the merged scan data forms the three-dimensional surface image of the object.

12 Claims, 9 Drawing Sheets

Focus Distance vs. Scan Width and Height

Focus Distance vs. Scan Depth

Focus Distance vs. Scan Depth

Top View

Front View

RANGE CAMERA CONTROLLER FOR ACQUIRING 3D MODELS

BACKGROUND OF THE INVENTION

The field of the invention is imaging and measurement systems. More particularly, the present invention relates to a system and method for acquiring a three-dimensional surface image of an object using a range camera.

A number of 3D range cameras have been introduced commercially in the last two years. In many fields ranging from computer-aided design and manufacturing to the entertainment and fashion industries, it is desirable to obtain a computer model of an object's surface geometry quickly and inexpensively. Range cameras are relatively inexpensive and easy to use compared to other three-dimensional imaging devices, such as X-ray machines. Range cameras can measure the range or distance from the camera to thousands of points distributed over the surface of an object in one "exposure" or snapshot. The result of the exposure is a computer file containing X, Y and Z coordinates of the sampled 3D points lying on the surface of the object. Some of these cameras work like a box camera, in which the camera points and shoots the object with fixed resolution and field of view. Other cameras are more complex and offer the ability to change optical parameters such as stand-off distance, focal distance, field-of-view and minimum/maximum range depth without moving the camera. To cover a large object, it may be necessary to acquire and merge many range images into a mosaic or composite set of points in such a way that there is an acceptable level of resolution and accuracy achieved.

Given an object to be measured, it is a complex task to determine the number of images required and the values of the optical parameters for each exposure. Without assistance, an operator experimentally determines a reasonable selection of vantage points and camera settings. Each selection typically must be verified via a test exposure of the camera, which comprises the steps of setting up the camera, setting the parameters into the camera, taking images, reviewing results, readjusting and repeating the steps, if necessary. Due to the involved interaction between optical parameters, it is often very difficult for the operator to predict the resultant resolution and accuracy of the total scan. Therefore, it becomes necessary to perform laborious trial and error approaches to achieve the desired appearance of the image.

What is desired is a system that will address some of the problems previously described with the use of range cameras. What is also desired is a system that automatically determines a scanning plan for a range camera including optimal view locations and a set of camera parameters for each view. What is also desired is a system that will automatically control the camera to acquire the collection of 3D images. There is a need for a system to acquire scan data having a level of resolution so that when the scan data is merged to form the three-dimensional surface image, the surface image has acceptable accuracy and resolution for a given application.

BRIEF SUMMARY OF THE INVENTION

A method of acquiring a three-dimensional surface image of an object using a range camera automatically calculates an optimal number of scans. The optimal number of scans is calculated in accordance with operator-defined and camera optical parameters. Scan data acquired for each scan is merged with a preference for higher resolution data over lower resolution data for any given scanned area, such that the merged scan data forms the three-dimensional surface image of the object.

A system for acquiring a three-dimensional surface image of an object includes a range camera controlled to automatically calculate a scanning plan in accordance with operator-defined parameters and camera optical parameters.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
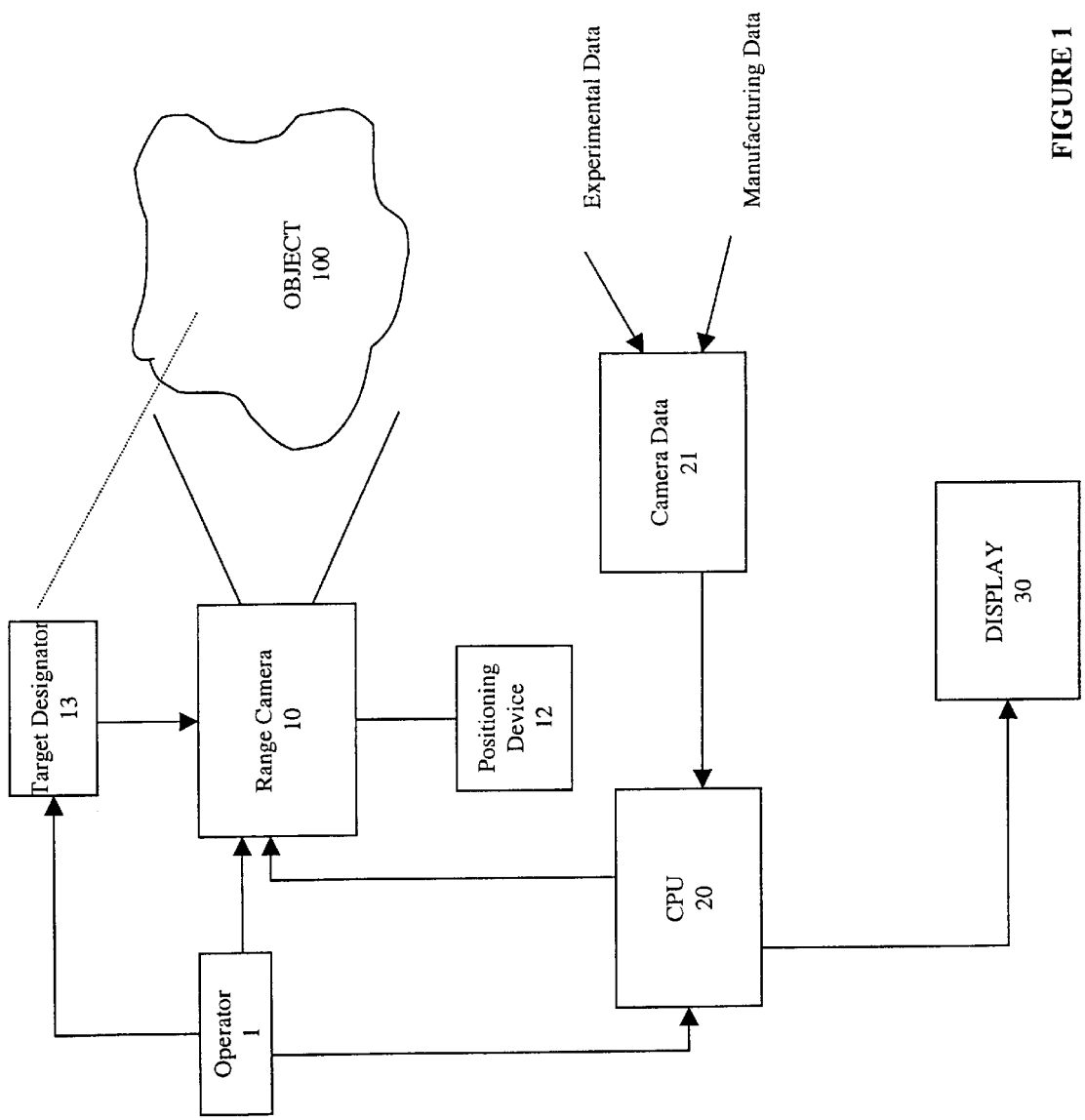
FIG. 1 is an illustration of a system for acquiring three-dimensional surface images of an object.

Referring to FIG. 1, a system for acquiring three-dimensional surface images of an object is shown. The system comprises range camera 10 coupled to CPU 20. Range camera 10 is similar in type to a Minolta VIVID 700 Non-Contact 3D Digitizer range camera, but can also be a number of 3D range cameras. CPU 20 is configured to receive camera settings and to process data for controlling range camera 10. As used herein, "adapted to", "configured" and the like refer to computational devices (such as programmable computing devices and application specific integrated circuits, or the like), that are programmed with algorithms to provided a desired computation processing of signals applied to the device. CPU 20 receives data acquired by a series of range camera scans and stores the data, in the form of range or scan data and processes the range data into 3D geometry to send to display 30. CPU 20 is an interface provided by the range camera manufacturer such as a workstation with graphics capability, or a computer with an interface to the range camera. Range camera 10 is coupled to positioning device 12 for placement and positioning of range camera 10 in relation to object 100. As used herein, "position" is defined as having two components, which are translation and orientation. Translation, the first component, consists of three dimensions (X, Y, Z). Orientation, the second component, consists of three angles (roll, pitch, yaw). Adjusting position, as used herein, refers to a change in either translation, orientation or a change in both translation and orientation. Alternatively, range camera 10 remains at a fixed position and object 100 is rotated or moved relative to range camera 10 by a similar positioning device. An operator 1 interfaces with range camera 10 and CPU 20 for the purposes of defining an area of interest or field of view within object 100.

Target designator 13 refers to a feature within a range camera (alternatively target designator 13 is an external device) for displaying the field of view of the camera onto the object. Target designator allows an operator the ability to select specific points or two-dimensional areas on a target object to be viewed, modified, modeled, or scaled with ease. For example, target designator 13 frames an area of interest on an object with an illuminated box projected onto the object, where the box is generated by a red laser. This would be particularly useful when an operator is working with or moving the object and would like to see the frame of the object that is captured by the viewfinder of the camera. By illuminating or projecting a framed area of interest physically on the object, the operator does not need to step behind the camera and look through the camera to determine if the area of interest is in view.

CPU 20 is also configured with software for formatting range or scan data acquired from range camera 10. The software processes the scan data by registering and merging multiple scans, including but not limited to data smoothing and subsampling. The software is capable of controlling range camera 10 for scanning, zooming, and focusing, both manually and by remote control. The software outputs scan data in the form of polygonal mesh, color image or texture maps.

Camera data 21 is coupled to CPU 20. Camera data 21 includes the optical parameters or characteristics of range camera 10. Camera data 21 is either acquired by range camera manufacturer data, such as provided by user manuals, or experimentally in which the operator can measure scan width, height and depth for varying distances from the camera to the object to acquire the optical parameters.

Generally, terms for optical parameters of photography apply for a range camera, with some exceptions that will be explained. Lens 11 is an adjustable-focus lens, in which lens 11 has adjustable distance settings to an object. An operator views through lens 11 to determine the area of interest or field of view. Field of view, also referred to as angle of view in photography, refers to the area of a scene that a lens covers or sees. Field of view is determined by the focal length of the lens. In the Minolta VIVID 700 range camera, for example, the field of view ranges from 70 mm ×70 mm to 1100 mm×1100 mm.

Focal length is a measure of the distance between the film and the optical center of the lens when the lens is focused on infinity. The focal length of the lens on most adjustable-focus lens cameras is marked in millimeters on the lens mount. Focus is an adjustment of the distance setting on a lens to define the subject or object sharply, which for a range camera is the front of the object as defined by the operator. Focus range is the range within which a camera is able to focus on the selected picture subject or object, for example 4 feet to infinity. In the Minolta VIVID 700 range camera, for example, it scans objects from 600 mm to 2500 mm in front of the camera. A zoom lens is a lens that adjusts the focal length over a wide range. In effect, a zoom lens gives lenses of many focal lengths. In the Minolta VIVID 700, which has a zoom lens, the range of focal lengths are 8 settings from 9 mm to 46 mm, which are referred to in the FIGS. 3, 4 and 5 as Zoom 1 through Zoom 8. A wideangle lens, which has a short focal length, includes more of a scene than a normal or telephoto (long focal length) lens.

Depth of field is the amount of distance between the nearest and farthest objects that appear in acceptably sharp focus in a photograph. Depth of field depends on lens opening, the focal length of the lens and the distance from the lens to the subject.

In the operation of a range camera, scanning is performed in slabs of data, where a slab is defined by a front plane and a rear plane. Depth of field in a range camera refers to the distance along the optical axis of the range camera between which the range camera is able to acquire meaningful data for a given focal length of the lens. In effect, depth of field refers to the thickness of the slab of data acquired by a range camera scan. Similar to photographing an object, operator 1 has the ability to view the object through the range camera in order to define the desired field of view and adjust the focus. Additionally, operator 1 sets a front plane of the viewing area and a rear plane of the viewing area.

Range camera 10 sends range data to be converted by CPU 20 into three-dimensional geometry and texture data, in accordance with principles known in imaging. Range camera 10 acquires data by scanning the surface of object 100, for example Minolta VIVID 700 scans from top to bottom, with a projected laser light beam. The reflected rays are collected within the camera. As range camera 10 scans object 100, it provides a measure of the three-dimensional coordinates of points on the surfaces of the object being scanned or sampled. Embodiments for acquiring a three-dimensional surface image of object or objects using a range camera will be described with reference to FIGS. 2–8.

Figure 2:
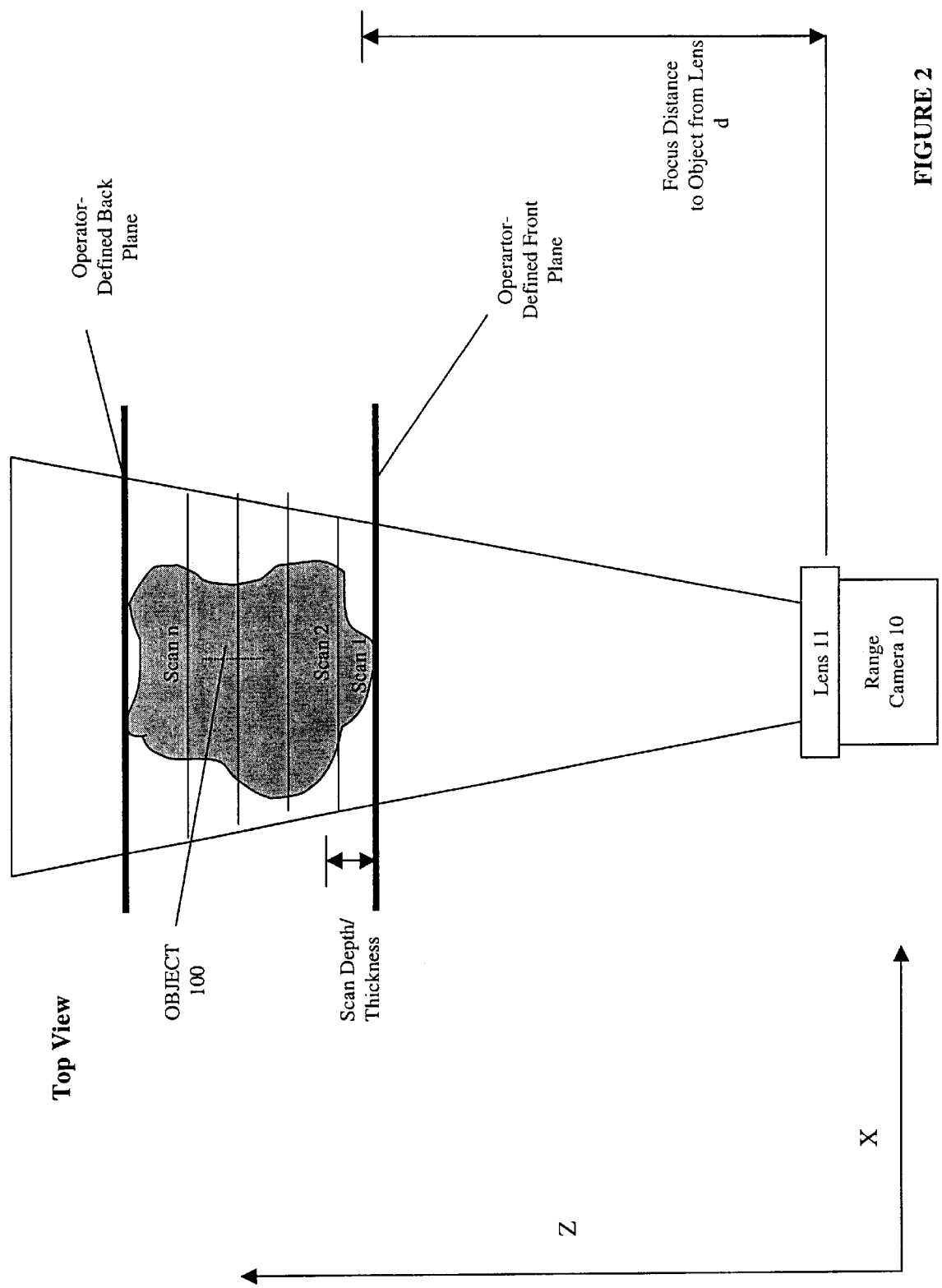
FIG. 2 is a top view of a range camera set up and directed to scan an object.

FIG. 2 illustrates a top view of range camera 10 that is set up and directed to scan object 100. The data provided by the range camera is in the form of slabs through the object, the depth or thickness of the slab and the object being shown along the Z dimension. Each slab of data, resulting from a scan by the range camera 10, is non-overlapping with a previous or subsequent slab. Alternatively, slabs minimally overlap (for example, overlap less than 10% of a slab thickness). However, overlapping slabs result in more required scans to cover the entire object, resulting in additional data processing to merge to form the three-dimensional surface image. The thickness of the slab is dependent on the focal length of the lens and the distance of the lens to the point or area of the object defined in the field of view. Range camera 10 segments an object into a number of range points per scan in the X and Y coordinates, for example the Minolta VIVID 700 segments an object into 200×200 points per scan. The range points per scan is a measurement of the resolution of the range camera, and is generally provided by the range camera manufacturer.

Figure 3:
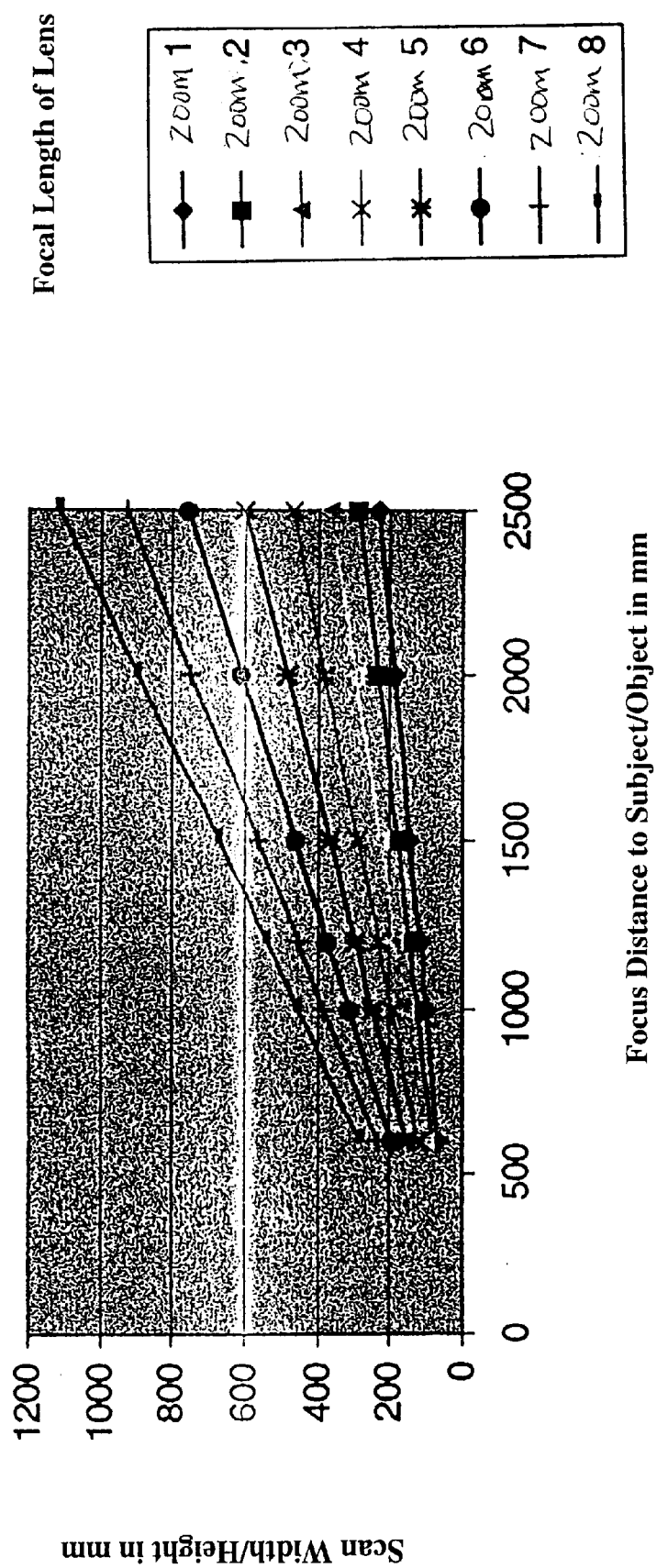
FIGS. 3–5 graphically illustrate optical parameters for a range camera of a type described herein.
Figure 4:
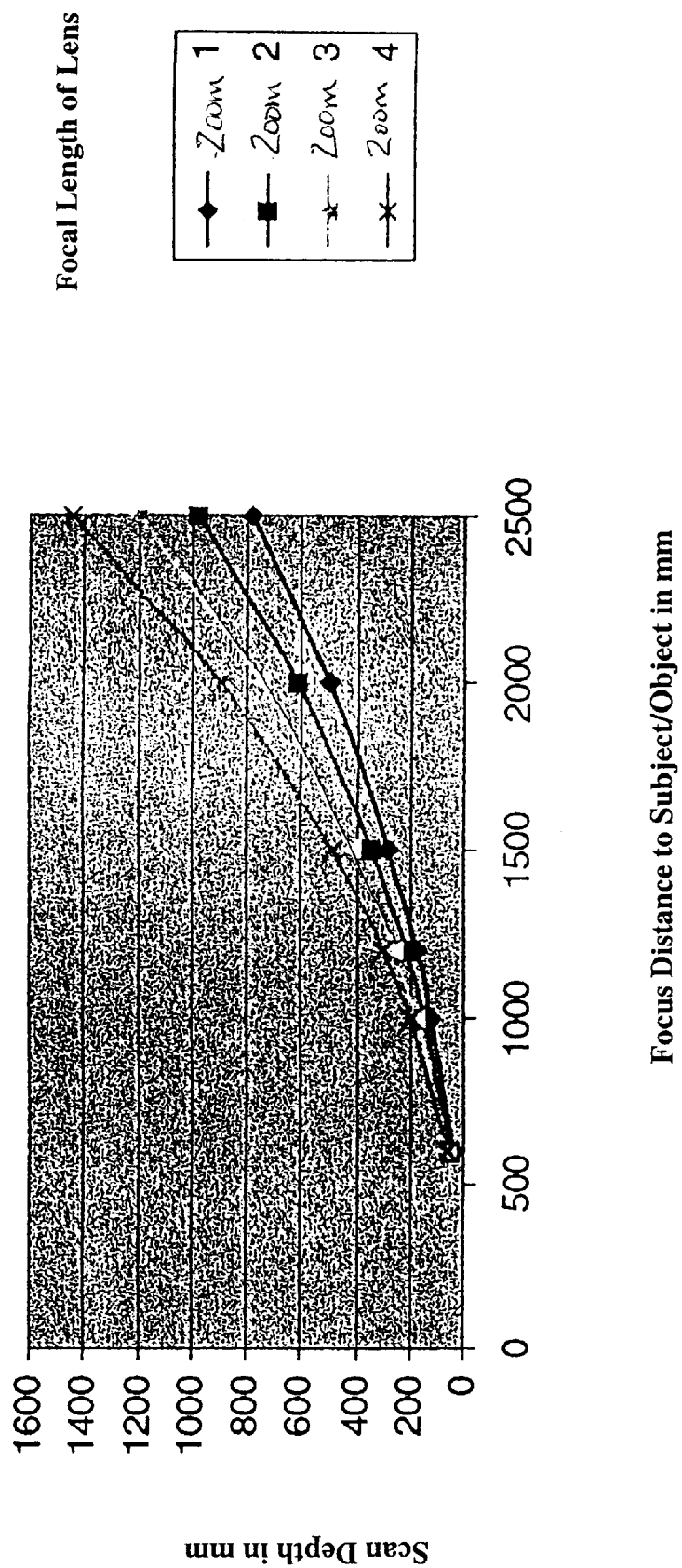
Figure 5:
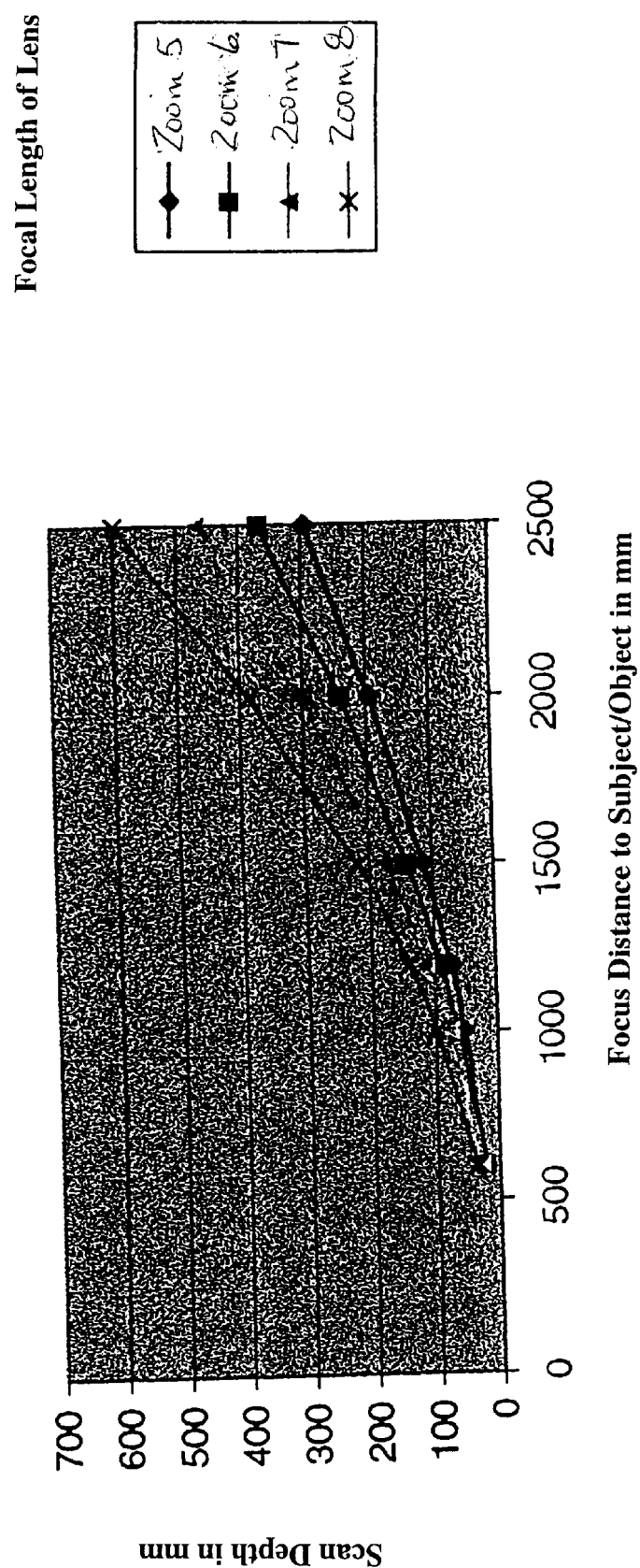

The optical parameters of range camera 10 are acquired for each zoom setting of lens 11. Acquiring and storing the optical parameters is preferably performed prior to execution of a scanning plan by range camera 10, thereby allowing for automatic operation with the stored optical information. The optical parameters are stored, for example, on CPU 20. FIGS. 3, 4 and 5 graphically illustrate the optical parameters, as an example, for the MINOLTA VIVID 700.

FIG. 3 graphically illustrates the scan width and height for various focal lengths of lens 11 (each of eight zoom settings of lens 11) at various focus distances. Referring again to FIG. 2, focus distance d represents the distance from the lens to the area of interest. At each focal length of the lens, the scan width and height is measured relative to focus distances ranging from 600 mm to 2500 mm, and is graphically shown in FIG. 3. Curve fitting techniques are used to approximate scan width and height measurements for focus distances not measured. The scan width and height represents the area the operator sees in the field of view at various focal lengths and focus distances. The scan width and height will have approximately the same value, since range camera 10 segments an object into a slice (for example, the Minolta VIVID 700 segments into a substantially square slice) having approximately the same number of range points per scan in both the X and Y dimensions, which in the Minolta VIVID 700 is 200×200 range points.

FIGS. 4 and 5 graphically illustrate the scan depth for various focal lengths of lens 11 (each of eight zoom settings of lens 11) at various focus distances. Scan depth relative to focus distance for focal lengths of a range camera lens is either provided by range camera manufacturer data or acquired experimentally. For each focal length of lens 11, scan depth is measured relative to focus distances ranging from 600 mm to 2500 mm, and curve fitting techniques are used to approximate scan depth for focus distances not measured. The scan depth is a measure of the thickness of the slab scanned by range camera 10.

By acquiring the optical parameters of scan width and height and scan depth for the different focal lengths of the lens at various focus distances, it becomes possible to automatically calculate a scanning plan or range camera scanning sequence of an object. A scanning plan acquires a calculated number n of slabs of range or scan data in accordance with the operator-defined parameters of field of view and front and back planes of a scanning volume, for a given focal length setting. As the scanning plan proceeds from scan 1 to scan n, parameters such as the focus distance, slab thickness, width and height change. For example, referring to FIG. 2, when the scanning of slab 1 ends, the slab thickness establishes where in the object the scanning of slab 2 should begin. CPU 20 controls range camera 10 automatically during the scanning plan, with the stored optical parameter information Referring again to FIG. 2, a range camera scanning sequence is described below. Operator 1 views object 100 through range camera 10 for determining a field or view, or area of interest, on object 100 to be imaged. Alternatively, operator 1, using target designator 13, frames an area of interest on an object with an illuminated box projected onto the object. Operator 1 selects and sets the focal length of lens 11. Operator 1 also defines a range beginning with a distance in front of the camera to where scanning will start (front plane) and ending with a distance from the front of the camera to where scanning will end (back plane), thereby defining a scanning volume to be measured or scanned by range camera 10. Preferably the front and back planes are in front of and behind the object, respectfully, so that the object is within the scanning volume being measured.

Based on the operator-defined parameters of focal length of the lens, field of view and measurement volume, defined by front and back planes, and the previously acquired and stored optical parameters for each focal length setting of lens 11, CPU 20 automatically calculates a scanning plan of the object. The scanning plan will calculate the number of scans required to scan the object based on the operator-defined front and back planes of the scanning volume, and the operator-defined lens setting.

Range camera 10, controlled by CPU 20, automatically performs the calculated number of scans starting at the operator-defined front plane of the scanning volume and continuing until the operator-defined back plane of the scanning volume. The optical parameters, which are graphically illustrated in FIGS. 3–5, and the operator-defined parameters determine the scanning plan and guide the range camera, as controlled by CPU 20. The scan datum acquired by each of the scans is stored in CPU 20, shown as scan 1 through scan n on FIG. 2. Upon completion of the calculated number (n) of scans, CPU 20 then merges the stored data to form a three-dimensional surface image of the object to be output to display 30 (not shown). The scanning plan is completed automatically, thereby eliminating operator guesswork and iterative trial and error approaches.

Alternatively, operator 1 may wish to change the focal length of the lens and execute an automatic scanning plan at different focal length settings. Operator 1 views object 100 through range camera 10 at a focal length setting to define a field of view. Within the defined field of view, operator 1 zooms all the way (changes the focal length of the lens) into a particular area of interest within the original defined field of view. Operator 1 frames a field of view either through lens 11, or by projecting a frame using target designator 13 (not shown, refer to FIG. 1). Zooming, or changing the focal length of lens 11, will have the effect of changing the field of view, making it narrower. Operator 1 defines the front plane and back plane of the desired scanning volume to be measured or scanned by range camera 10. Based on the operator-defined field of view, zoomed in area of interest, and the front and back planes of the scanning volume, CPU 20 then automatically controls range camera 10 to scan the scanning volume at different focal length settings of lens 11, in accordance with the acquired and stored optical parameters graphically illustrated in FIGS. 3–5. The range camera sequentially acquires scan or range data at various focal lengths of the lens. A range of focal lengths of the lens is specified by operator 1, or, alternatively, CPU 20 automatically sequences a scanning plan at each focal length setting of the lens.

Figure 6:
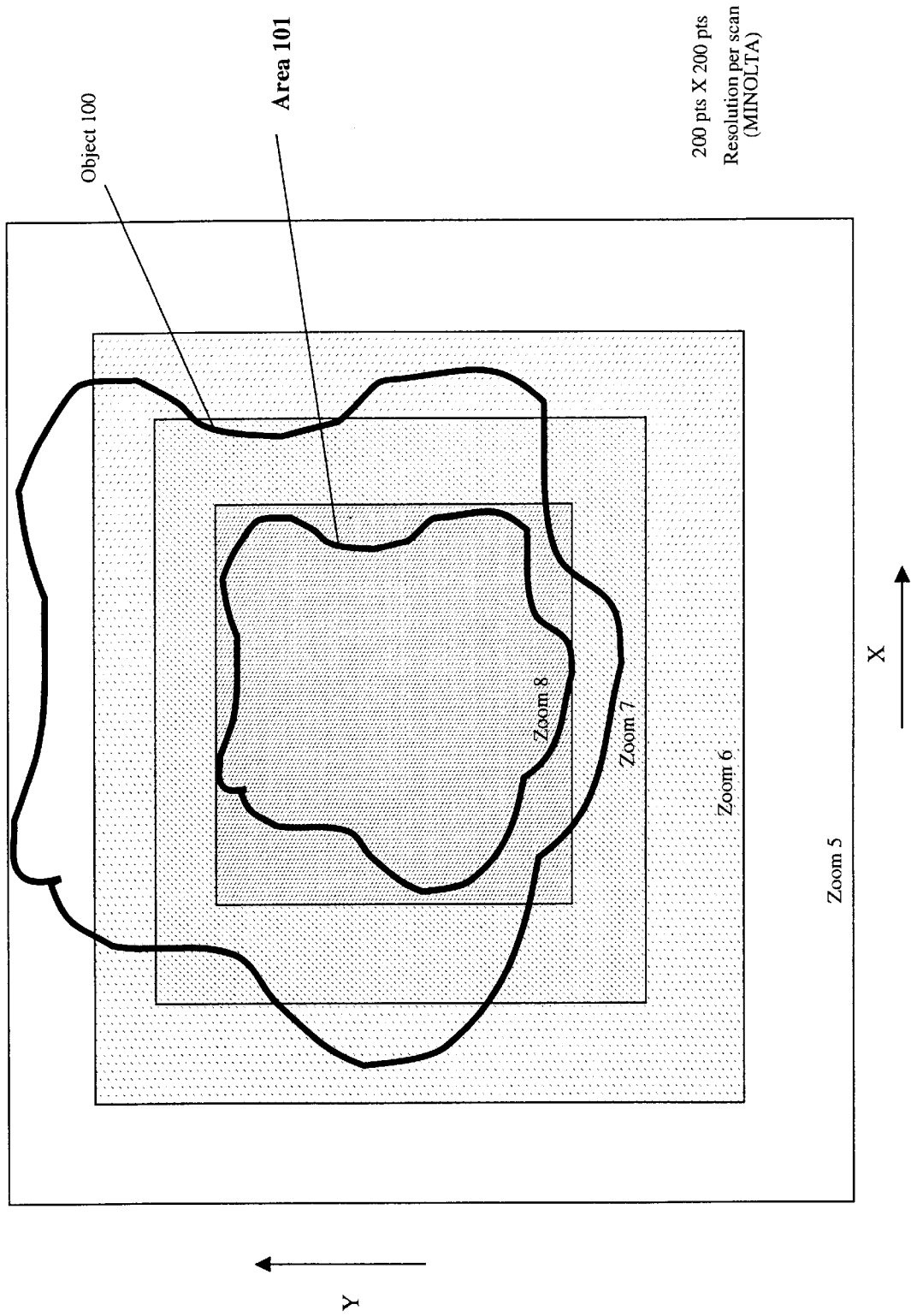
FIG. 6 is a front view illustration of a series of scan data acquired by a range camera by a method described herein for acquiring a three-dimensional surface image of an object.

FIG. 6 illustrates a front view of a series of scans at various focal lengths or zoom settings for acquiring a three-dimensional surface image of object 100, in which a particular area of interest 101 is shown. Operator 1 zooms into area of interest 101, shown as Zoom 8 in FIG. 6. As is shown in FIG. 2, the scan sequence scans the object 1 through n (number of calculated scans in accordance with optical parameters and operator-defined parameters) times for each zoom setting. The scanning is repeated for each zoom setting until range camera 10 proceeds through the range of focal lengths specified by operator 1 (shown as Zoom 5 through Zoom 8 in FIG. 6), or alternatively through all zoom settings. For each zoom setting, a series of scans 1–n exists at various resolution levels. A smaller field of view, defined by width and height of the field of view, has greater resolution, since the range points per scan have a greater density. Conversely, a larger field of view is defined by less resolution, since the same number of range points per scan occupies a larger area. Where an area of the object is scanned multiple times at different zoom settings and resolution, the higher resolution datum is selected by CPU 20 (not shown, refer to FIG. 1) for the merging of scan data to form the three-dimensional surface image for display. Advantageously, in this alternative embodiment, a particular area of interest is acquired for the three-dimensional image with a resolution parameter of high resolution scan data, and the surrounding area is captured for context by acquiring scan data at the various focal lengths, or zoom settings, of the lens. The scan data of various levels of resolutions are merged to form a three-dimensional surface image of the particular area of interest in object 100, while also displaying contributions from each focal length setting of the lens to show areas surrounding the particular area of interest for context. Alternatively, the resolution parameter is predetermined at a lower resolution if the given application requires a resolution less than the highest resolution scan data.

Figure 7:
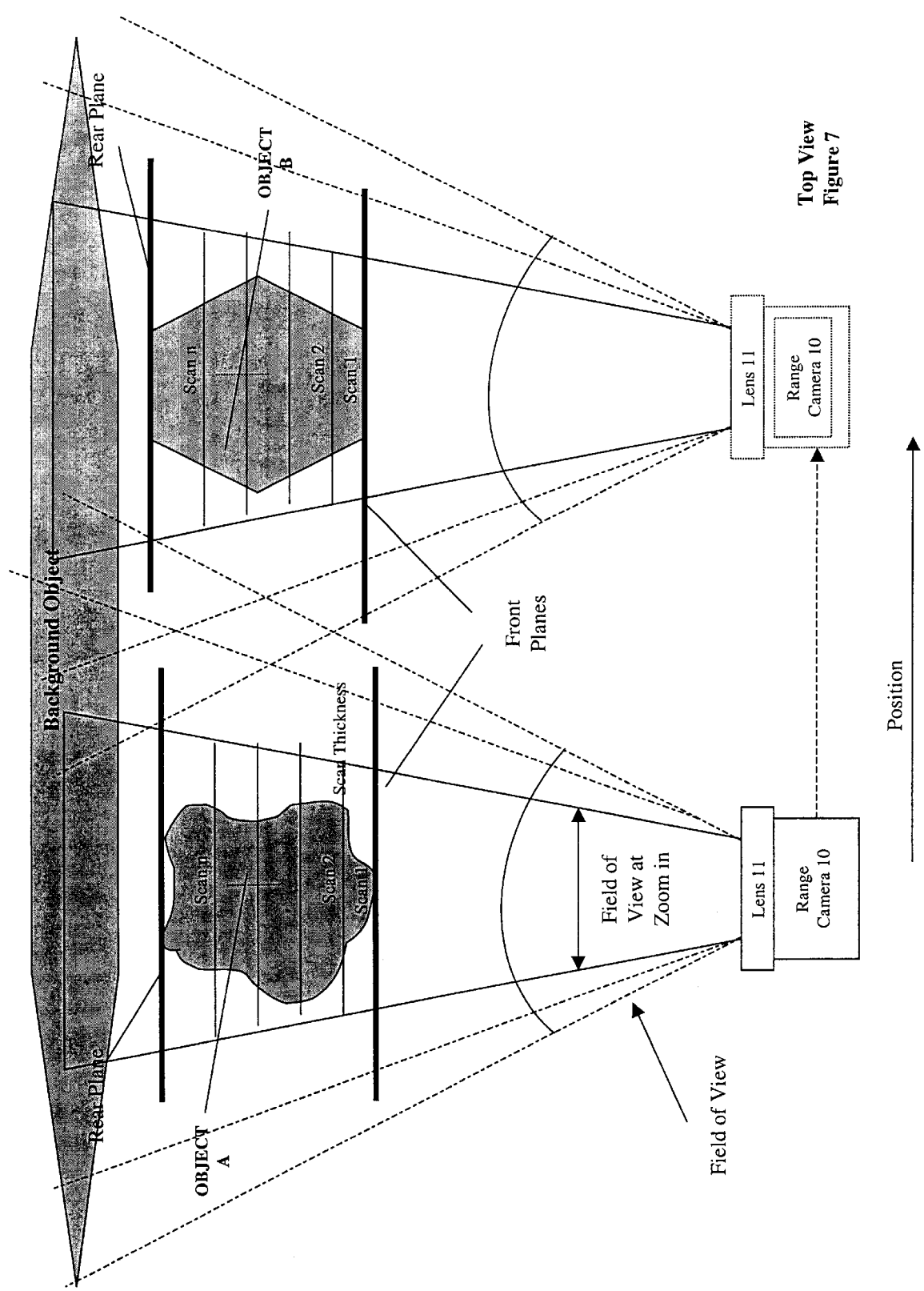
FIG. 7 is a top view of a range camera set up and directed to scan two objects.

FIG. 7 illustrates a top view of range camera 10 that is set up and directed to scan or measure two objects. Objects A and B are in context with a background, shown as background object. Operator 1 views objects A and B separately through range camera 10 for determining a view area, or area of interest, on each object. Operator 1 adjusts the focal length of the lens, or zoom position, to frame an area of interest on each object. The position of range camera 10 is adjusted manually, or for example, by positioning device 12 of FIG. 1. Operator 1 defines a front plane for where scanning should start and a back plane defining where scanning should end for each object. Based on the operator-defined parameters of field of view, and the front and back planes of the scanning volume, CPU 20 then automatically controls range camera 10 to scan the scanning volume for each object at different focal length settings of lens 11, in accordance with the acquired and stored optical parameters graphically illustrated in FIGS. 3–5. The range camera will sequentially acquire scan or range data at various focal lengths of the lens. A range of focal lengths of the lens is specified by operator 1, or, alternatively, CPU 20 automatically sequences a scanning plan at each focal length setting of the lens. The focal length of lens 11 is changed so that the field of view captures a wider view area. Preferably, at least one of the field of views for each object should overlap in part with a field of view of the other object, as shown in FIG. 7, to acquire overlapping scan or range data, in order to capture some of the background object as context for Objects A and B.

The position of range camera 10 is adjusted either manually, or by positioning device 12, of FIG. 1. Alternatively, positioning device 12 is an automatic positioning device, for example a robot arm, controlled by CPU 20. CPU 20 controls the number of positions, based on operator-defined parameters and optical parameters, to move the camera to the number of positions needed to acquire overlapping scan or range data. Advantageously, by controlling the number of positions of range camera 10, the amount of range data is reduced thereby reducing image processing requirements when merging the data to form the three-dimensional surface image.

Figure 8:
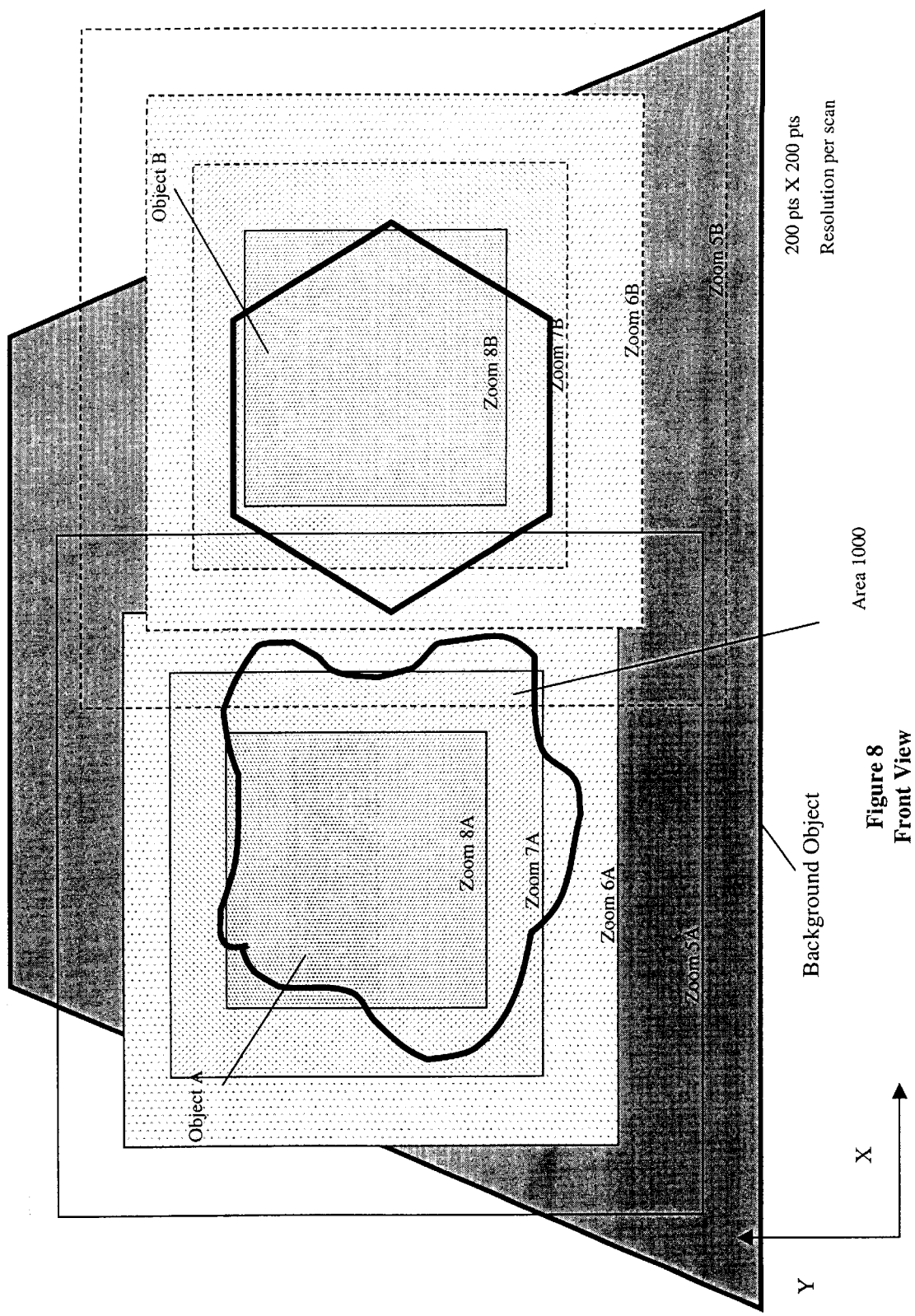
FIG. 8 is a front view illustration of a series of scan data acquired by a range camera by a method described herein for acquiring three-dimensional surface images of an object or objects; and, FIG. 9 is a top view of a range camera set up for acquiring a three-dimensional surface image of multiple objects by a method described herein.

FIG. 8 shows a front view of a series of scans for acquiring a three-dimensional surface image of two objects. Each object is scanned as shown in FIG. 7 in which the operator allows the zoom setting to be varied and scanning is performed 1 through n times at each zoom setting. In this embodiment, the two objects, and the resulting scan data, are placed in a common coordinate system. The scan data sets for each of objects A and B (acquired either for a single lens setting or for various lens settings) are merged by CPU 20 to form a three-dimensional surface image including both objects. The higher resolution data from each of the scan data sets is selected for the merging, thereby providing the highest resolution for the resultant three-dimensional surface image. Area 1000 of FIG. 8 shows an area that has been scanned by Zoom 7A, Zoom 6A, Zoom 5A, and Zoom 5B. The scan data that will be merged to form the three-dimensional surface image will select the scan data with the highest resolution, for example the scan data from the scan of Zoom 7A.

While FIGS. 7 and 8 illustrate a method for acquiring a three-dimensional surface image of two objects, it is appreciated that acquiring a three-dimensional surface image of multiple objects employs the same method.

Figure 9:
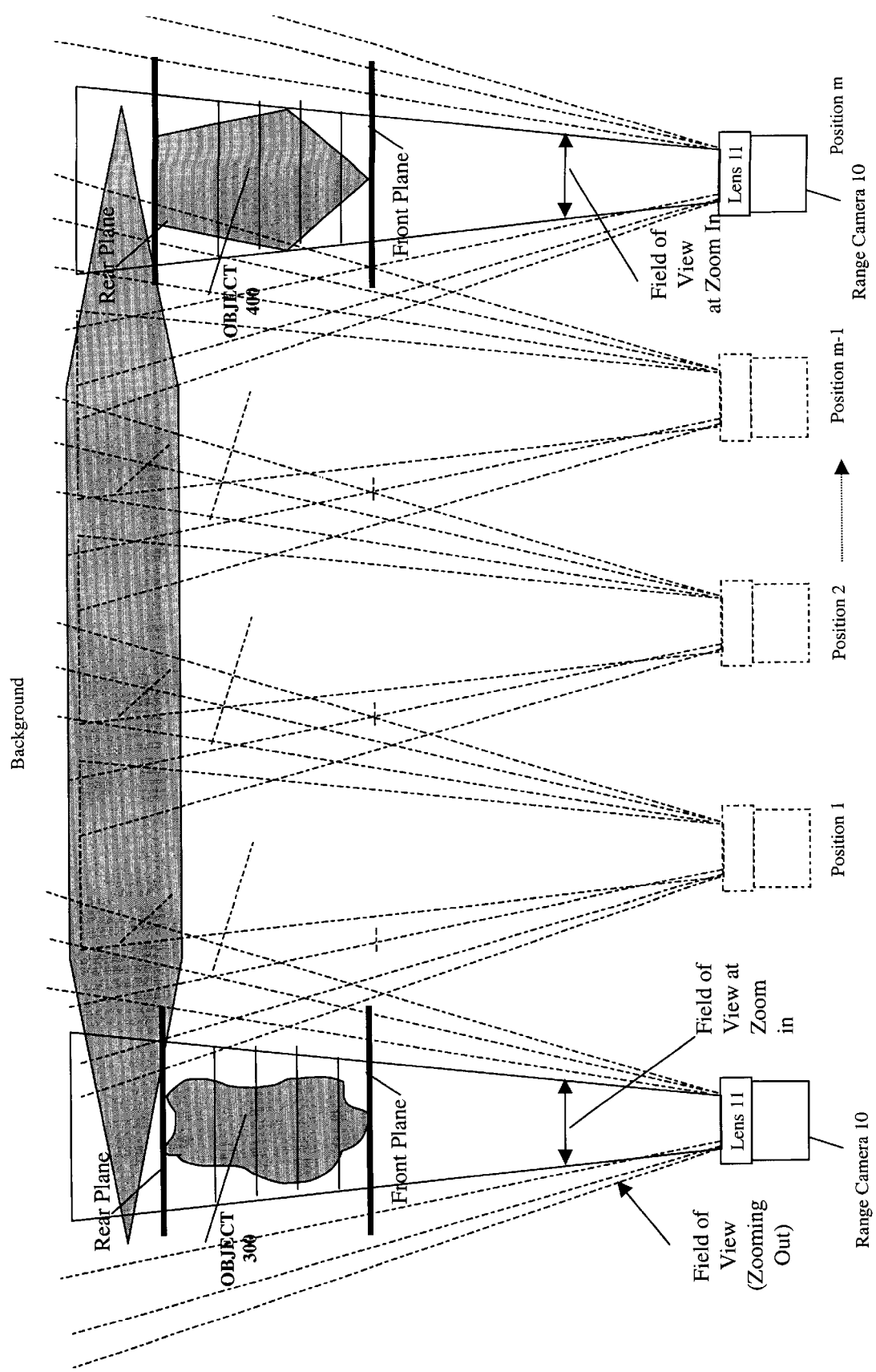

FIG. 9 illustrates a top view of a range camera set up to measure two objects. Objects 300 and 400 are positioned in a view area that exceeds the range camera capabilities. For example, range cameras generally have a limitation on how far a range camera can be from an object or subject. Therefore, it is not possible to move the range camera farther away from Objects 300 and 400 to capture a wider view area. The optical parameters also impose further limitations. For example, as shown in FIG. 9, when range camera 10 measures each object with a maximum field of view, shown as field of view (zooming out), for any of the focal lengths of lens 11, none of the field of views overlap in part. In a further embodiment, it is possible to acquire scan data including Objects 300 and 400 and background information. The position of Objects 300 and 400 are input to CPU 20. The position of each object defines the outer limits of a desired scanning volume. The position can either be provided by an interface to a positioning device, such as a robot arm or positioning device 12 from FIG. 1, or manually from Operator 1 (not shown, see FIG. 1). Based on the defined scanning volume and optical parameters of the range camera (graphically illustrated in FIGS. 3–5), CPU 20 then automatically controls the positioning device and range camera 10 to scan the scanning volume for different positions of the range camera relative to the objects. Range camera 10 sequentially acquires scan or range data at various positions, the number of positions (m) being calculated by CPU 20. A field of view at a given position overlaps with a previous and subsequent field of view, for a previous position and subsequent position, respectfully, forming a contiguous series of overlapping fields of view. FIG. 9 shows position m-1 overlapping with position m. The range camera sequences through the scanning volume, until the range camera reaches the defined location of Object 400. The scan data at the various positions are merged to form a three-dimensional surface image including both objects and the background for context.

Advantageously, a three-dimensional surface image of an object or objects is acquired automatically with less operator guesswork. The scan data that is merged to form the three-dimensional surface images is selected with a preference for higher resolution data over lesser resolution data for an area that is scanned multiple times. Therefore, the resultant three-dimensional surface image contains the highest possible resolution for a scanned area, which will improve the overall appearance of the resultant image.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of acquiring a three-dimensional surface image of at least one object using a range camera, comprising the steps of:
   receiving operator defined parameters;
   calculating a number of scans required for the range camera to scan the at least one object in accordance with optical parameters for the range camera and the operator defined parameters;
   controlling the range camera to perform the calculated number of scans, the scans generating scan data for each of the calculated number of scans; and,
   merging the generated scan data to form the three-dimensional surface image of the at least one object.

2. The method as recited in claim 1 wherein the optical parameters for the range camera are stored for a plurality of settings of a lens for the range camera.

3. The method as recited in claim 1 wherein the operator defined parameters comprise view area, a focal length for a lens of the range camera, and a volume to be scanned by the range camera.

4. The method as recited in claim 1 wherein resolution corresponds to a measure of points per scan in two dimensions.

5. A method of acquiring a three-dimensional surface image of at least one object using a range camera, comprising the steps of:

receiving operator defined parameters;

calculating a number of scans required for the range camera to scan the at least one object in accordance with optical parameters for the range camera and the operator defined parameters;

controlling the range camera to perform the calculated number of scans at a plurality of settings for a lens of the range camera, each scan generating respective scan datum at each of the plurality of settings for the lens;

selecting data from the generated scan data according to resolution parameters for a given scanned area, the resolution corresponding to a number of points per scan in two dimensions; and, merging the selected data to form the three-dimensional surface image of the at least one object.

6. The method as recited in claim 5 wherein the optical parameters for the range camera are stored for a plurality of settings of a lens for the range camera.

7. The method as recited in claim 5 wherein the operator defined parameters comprise view area and a range of focal lengths of a lens of the range camera.

8. The method as recited in claim 5 wherein the range camera is controlled to perform scans of multiple objects for generating scan data for each of the multiple objects, the generated_scan data being selected according to resolution and merged to form a three-dimensional surface image of the multiple objects.

9. The method as recited in claim 8 wherein the position of the range camera is controlled to perform scans for multiple objects.

10. A system for acquiring a three-dimensional surface image of at least one object using a range camera, comprising:

a range camera configured to generate scan data during scanning of the object;

a display device; and, an interface coupled to the range camera and the display device, the interface being configured for controlling the range camera to perform a calculated number of scans of at least one object in accordance with optical parameters for the range camera and operator defined parameters, the interface storing and selecting scan data to be displayed as a three-dimensional surface image of the at least one object by the display device.

11. The system of claim 10, further comprising a positioning device coupled to the interface and the range camera for controlling position of the range camera during the scanning by the range camera.

12. The system of claim 10, further comprising a target designator for displaying the operator defined view area on the object.

* * * * *